United States Patent [19]

Uchiyama et al.

[11] Patent Number: 5,747,763
[45] Date of Patent: May 5, 1998

[54] FITTING STRUCTURE OF ROTARY CONNECTOR AND SWITCH

[75] Inventors: Norio Uchiyama; Yoshio Hattori, both of Tokyo, Japan

[73] Assignee: Niles Parts Co., Ltd., Japan

[21] Appl. No.: 670,669

[22] Filed: Jun. 26, 1996

[30] Foreign Application Priority Data

Nov. 24, 1995 [JP] Japan .................... 7-329669

[51] Int. Cl.⁶ .................................................. H01H 9/00
[52] U.S. Cl. .............................. 200/61.54; 200/61.27; 439/15
[58] Field of Search ................ 200/61.54, 61.55, 200/61.56, 61.57, 293, 295, 61.27–61.29; 439/15, 164

[56] References Cited

U.S. PATENT DOCUMENTS

| | | | |
|---|---|---|---|
| 3,766,351 | 10/1973 | Cryer | 200/61.27 X |
| 3,881,076 | 4/1975 | Latka et al. | 200/61.54 |
| 4,336,428 | 6/1982 | Berginski | 200/61.54 |
| 4,422,699 | 12/1983 | Sakurai et al. | 439/15 |
| 4,739,132 | 4/1988 | Erdelitsch et al. | 200/61.54 |

FOREIGN PATENT DOCUMENTS 3-48867  6/1989  Japan .

*Primary Examiner*—Stuart N. Hecker
*Assistant Examiner*—K. Shin
*Attorney, Agent, or Firm*—Ronald P. Kananen

[57] ABSTRACT

A rotary connector 1 has a resilient engagement plate 3d to be snap-fitted to a base 5 of a switch 4. The base 5 has a first engagement portion 5b with which the resilient engagement plate 3d of the rotary connector 1 engages, and a second engagement portion 5c to which an engagement protuberance 7b of a bracket 7 fixed to a steering column, or the like, is fitted. The bracket 7 has the engagement protuberance 7b. The invention provides a fitting structure that permits the rotary connector to be easily fixed to the base, and the base to be easily fixed to the bracket.

7 Claims, 2 Drawing Sheets

FITTING STRUCTURE OF ROTARY CONNECTOR AND SWITCH

BACKGROUND OF THE INVENTION

1. Field of the Invention

The present invention relates generally to rotary connectors and, in particular, to a fitting structure of a rotary connector and a switch for fixing a rotary connector of an automobile to a base of a switch, such as a combination switch, and for fixing the base to a bracket.

2. Description of the Related Art

An example of technologies of this kind is disclosed in Japanese Utility Model Publication No. 3-48867 (1991). A rotary connector of this technology is screw-fixed by four screws to a base of a combination switch. The combination switch is in turn screw-fixed to a steering column by another three or more screws.

According to the prior art technology described above, however, the rotary connector is screwed to the base of the combination switch, and the base is screwed to the steering column by other screws. Therefore, the number of screws and the number of screw management steps increase, the production cost becomes higher, and the quality of assembly drops.

SUMMARY OF THE INVENTION

An object of the present invention is to eliminate the problems associated with the conventional fitting structure described above.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To overcome the problems associated with the prior art, the fitting structure of the present invention comprises a rotary connector having a resilient engagement plate to be snap-fixed to a base of a switch, the base having a first engagement portion engaging with the resilient engagement plate of the rotary connector and a second engagement portion engaging with an engagement protuberance of a bracket fixed to a steering column, or the like, and the bracket having the engagement protuberance. The fitting structure functions to firmly fix the rotary connector, the base, and the bracket.

The bracket of the present invention is preferably formed integrally with a key cylinder body of an ignition key.

The bracket of the present invention is preferably formed integrally with a fitting portion to be fixed to a steering column.

The second engagement portion of the present invention preferably includes a resilient pawl plate engaging with an engagement portion formed on the engagement protuberance, and a protrusion engaging with a longitudinal groove formed on the engagement protuberance.

The first engagement portion of the present invention preferably includes a step portion engaging with a pawl formed on the resilient engagement plate.

The rotary connector of the present invention preferably includes a first screw insertion hole for passing a screw, and the base includes a second screw insertion hole for passing the screw, which is driven into a screw hole in the bracket so that the rotary connector may be fixed to the base.

The screw in the present invention, consisting of only one screw, is driven into the screw hole in the bracket through the first screw insertion hole of the rotary connector and the second screw insertion hole of the base.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENTS

Figure 1:
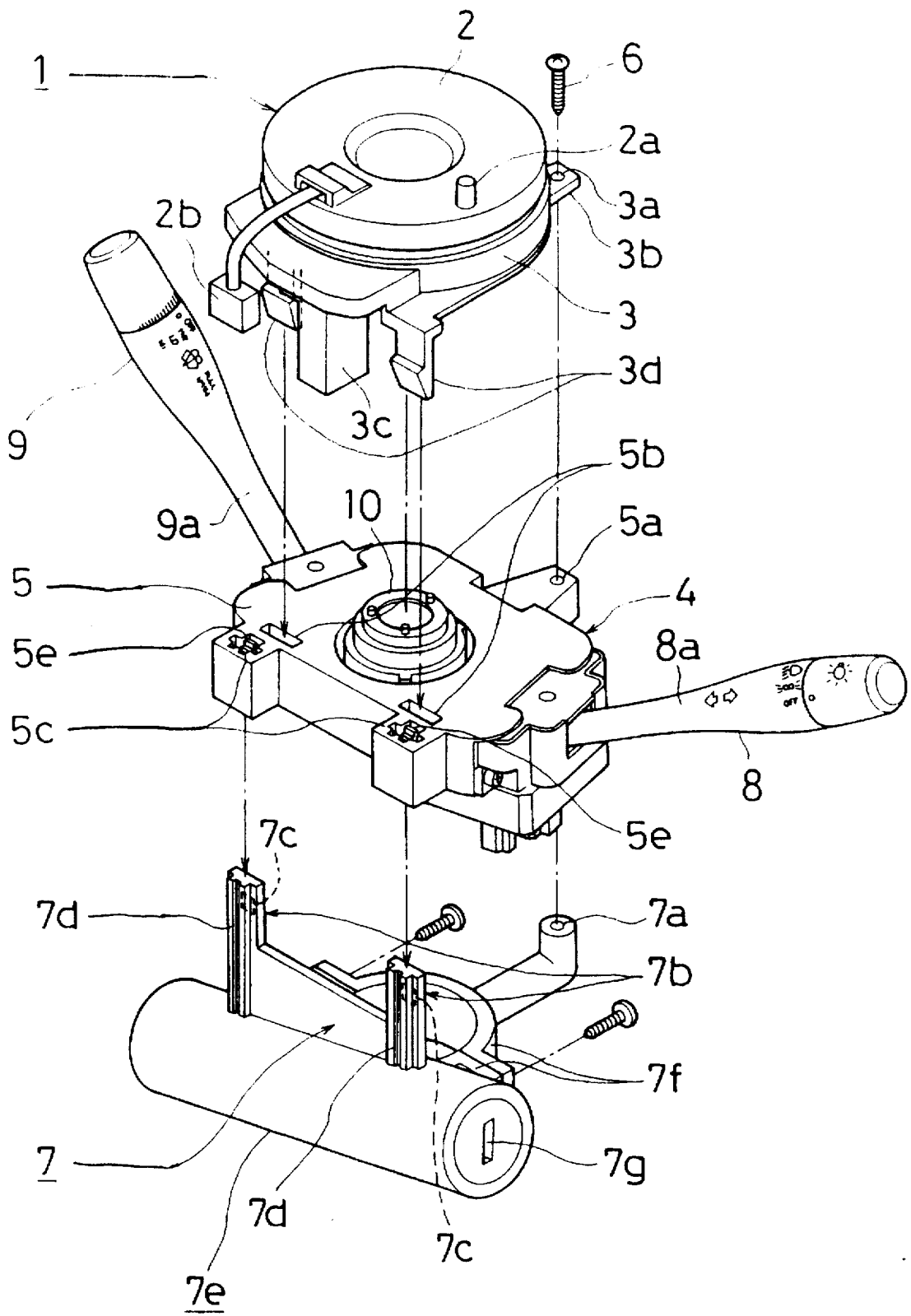
FIG. 1 is an exploded perspective view showing a preferred embodiment of the present invention.

A preferred embodiment of the present invention is described in detail with reference to the accompanying drawings.

Reference numeral 1 denotes a substantially doughnut-shaped rotary connector which accommodates a cable reel (not shown in the drawings). The rotary connector 1 comprises a rotary case 2 to be fixed to a steering wheel (not shown) and a stationary case 3 to be fixed to a base 5 of a switch 4, such as a combination switch.

The rotary case 2 includes a protruding rod 2a to be fitted into a blind hole (not shown) bored in the lower surface of the steering wheel and a connector 2b connected to one of the ends of the cable reel (not shown) in the rotary connector 1, and the rod 2a and connector 2b are disposed on the upper surface of the rotary case 2. The rotary case 2 is rotatably engaged with the stationary case 3. When the protruding rod 2a is fitted to the steering wheel, the rotary case 2 rotates with the steering wheel.

The stationary case 3 includes a protruding plate 3b having a first screw insertion hole 3a which coincides with a second screw insertion hole 5a bored in the base 5, a connector 3c connected to the other end of the cable reel accommodated in the rotary connector 1, and a resilient engagement plate 3d engaging with a first engagement portion 5b of the base 5. When the first engagement portion 5b of the base 5 is engaged with the resilient engagement plate 3d, the stationary case 3 is positioned to a desired position of the base 5. The stationary case 3 is fixed by a screw 6 to a bracket 7 with the base 5.

The first screw insertion hole 3a described above is bored in each protruding plate 3b on the same center line as those of the second screw insertion hole 5a and the screw fitting hole 7a. Each protruding plate 3b is formed at the outer peripheral portion of the stationary case 3. The length of the resilient engagement plate 3d is smaller than the thickness of the base 5 so that the distal end of the resilient engagement plate 3d does not protrude from the first engagement portion 5b when the resilient engagement plate 3d engages with the first engagement portion 5b. The number of the resilient engagement plate 3d may be single or plural, and their set positions are not particularly limited. Incidentally, it is possible to form the resilient engagement plate 3d on the base, and the first engagement portion 5b on the stationary case 3.

The switch 4 is, for example, a combination switch which includes a base 5, a turn signal switch 8 and a wiper switch 9. The base 5, the turn signal switch 8 and the wiper switch 9 of this switch 4 may be either integral or removable.

A cylindrical cancel member 10 for automatically returning an operation lever 8a of the turn signal switch 8 is rotatably fitted to the center of the base 5. The second screw insertion hole 5a and the second engagement portion 5c are formed at the outer peripheral portion of the base 5. The first engagement portion 5b is formed in the proximity of the second engagement portion 5c of the base 5. Incidentally, the formation positions of the first engagement portion and the second engagement portion 5c are not particularly limited.

Figure 2:
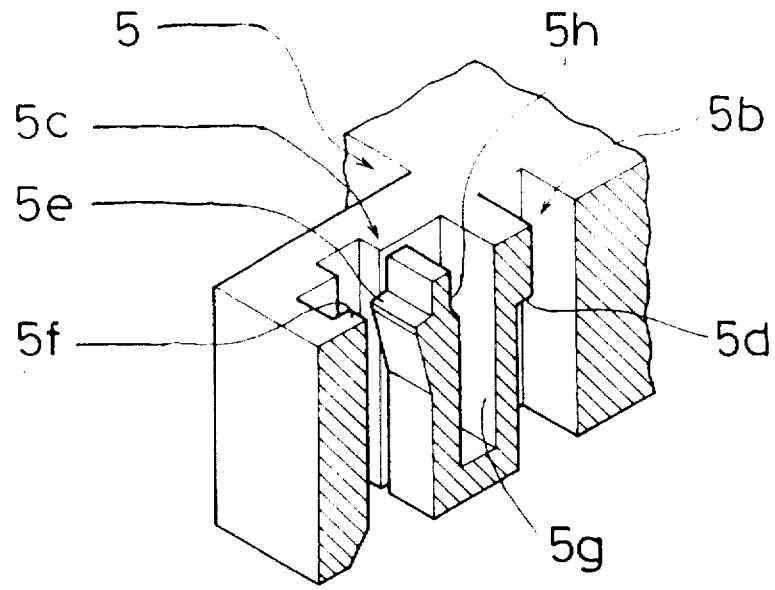
FIG. 2 is a sectional perspective view of the principal portions of the preferred embodiment of the present invention.
Figure 3:
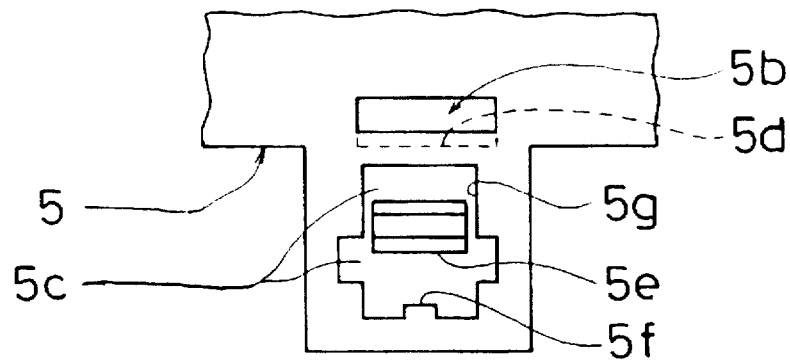
FIG. 3 is an enlarged plan view of the principal portions of the preferred embodiment of the present invention.
Figure 4:
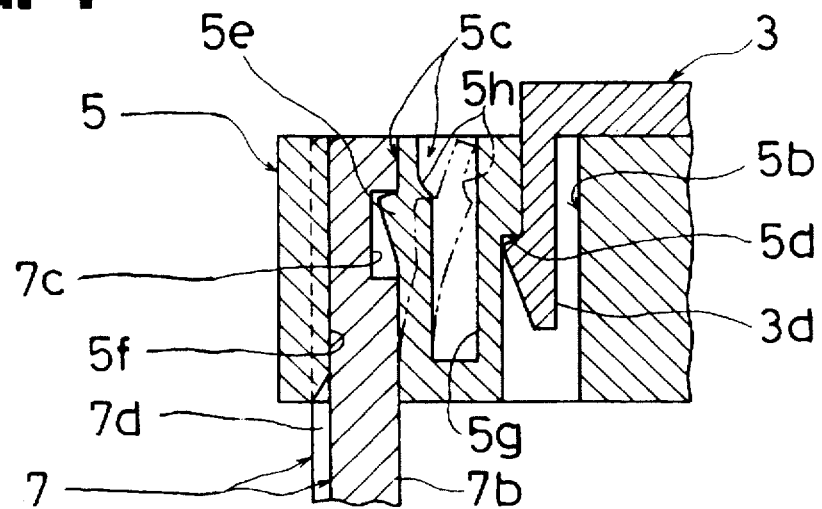
FIG. 4 is an enlarged central sectional view of the principal portions when a stationary case and a bracket are assembled to a base in the preferred embodiment of the present invention.

As shown in FIGS. 2 and 4, the first engagement portion 5b includes a step portion 5d with which the pawl of the resilient engagement plate 3d engages. The second engagement portion 5c comprises an insertion hole into which a substantially T-shaped engagement protuberance 7b fits, and as shown in FIGS. 2, 3 and 4, the second engagement portion 5c defines a resilient pawl plate 5e with which the engagement portion 7c of the engagement protuberance 7b engages, and a protrusion 5f which fits into a longitudinal groove 7d of the engagement protuberance 7b. The step portion 5d engages with the resilient engagement plate 3d fitted into the first engagement portion 5b and prevents this resilient engagement plate 3d from falling off.

The resilient pawl plate 5e is a protruding plate formed in the hole-like second engagement portion 5c. The pawl plate 5e is resilient because a blind hole 5g is formed on the back side of the pawl. As shown in FIGS. 2 and 4, the resilient pawl plate 5e is equipped at the upper end portion thereof with a notch portion 5h which expands the curving range of the resilient pawl plate 5e when the engagement protuberance 7b is fitted into the second engagement portion 5c. When engaged with the engagement portion 7c of the engagement protuberance 7c, the resilient pawl plate 5e prevents the engagement protuberance 7b from falling off from the second engagement portion 5c. The protrusion 5f, formed on the inner wall of the second engagement portion 5c, fits into the longitudinal groove 7d of the engagement protuberance 7b, prevents the shake of the engagement protuberance 7b and effects positioning to the bracket 7.

The screw 6, consisting of only one screw, is driven into the screw fitting hole 7a through the first screw insertion hole 3a and the second screw insertion hole 5a.

The bracket 7 comprises the screw fitting hole 7a described above, the engagement protuberance 7b, the key cylinder body 7e of the ignition switch (not shown) and a fitting portion 7f to the steering column (not shown). These constituent members are formed integrally. Since the screw fitting hole 7a must be disposed immediately below the second screw insertion hole 5a of the base 5, it is formed on an L-shaped pole member so formed on the bracket 7 as to extend from its substantial center to the outside. The engagement protuberance 7b comprises a plurality of substantially T-shaped protuberances formed immediately below the second engagement portion 5c of the base 5. Incidentally, it is also possible to form the engagement protuberance on the base 5 and the second engagement portion 5c, on the bracket 7.

The engagement portion 7c is a blind hole with which the resilient pawl plate 5e engages as shown in FIGS. 1 and 4, and may be composed of a through-hole. Incidentally, the engagement portion 7c may be formed on the base 5 and the resilient pawl plate 5e may be formed on the bracket 7. When engaging with the second engagement portion 5c, the longitudinal groove 7d prevents the base 5 from shaking in the horizontal direction with respect to the bracket 7. It is also possible to form the longitudinal groove 7d and the protrusion 5f on the bracket 7. The key cylinder main body 7e has a key hole 7g for inserting the ignition key.

The shape of the fitting portion 7f is not particularly limited so long as it can be fixed by a screw, or the like, to the steering column. This fitting portion 7f may be substantially belt-like as shown in FIG. 1, for example, or may be sheet-like.

The operation lever 8a of the turn signal switch 8 has the functions of a direction indicator, a lighting switch, a passing switch, a main dimmer switch, and so forth, for example. The operation lever 9a of the wiper switch 9 has the functions of a wiper washer switch, a wiper intermittent volume controller, and so forth, for example. The turn signal switch 8 and the wiper switch 9 are fitted to the base 5 and are fixed by screws, as shown in FIG. 1.

The present invention has the construction described above, and its operation will be described in detail with reference to FIGS. 1 through 4.

First, the bracket 7 is fixed by the screw to the steering column. Next, the second engagement portion 5c of the base 5 is engaged with the engagement protuberance 7b of the bracket 7. The protrusion 5f engages with the longitudinal groove 7d and the resilient pawl plate 5e engages with the engagement portion 7c, so that the base 5 is fixed and positioned to the bracket 7. In this way, the center of the screw fitting hole 7a is brought into conformity with the center of the second screw insertion hole 5a.

Next, the resilient engagement plate 3d of the rotary connector 1 is fitted into the first engagement portion 5b. Since the pawl of the resilient engagement plate 3d is anchored to the step portion 5d inside the first engagement portion 5b, the stationary case 3 is fixed and positioned to the base 5. In this way, the first screw insertion hole 3a is disposed at the position which coincides with the centers of the second screw insertion hole 5a and the screw fitting hole 7a.

Next, one screw 6 is passed through the first screw insertion hole 3a and the second screw insertion hole 5a and is fixed to the screw fitting hole 7a, the stationary case 3 is fixed to the base 5, and the base 5 is fixed firmly to the bracket 7.

Having the construction described above, the present invention provides the following effects.

(1) The rotary connector has the resilient engagement plate snap-fitted to the base of the switch, the base has the first engagement portion engaging with the resilient engagement plate of the rotary connector and the second engagement portion engaging with the engagement protuberance of the bracket fixed to the steering column, or the like, and the bracket has the engagement protuberance. Therefore, the rotary connector can be easily fixed to the base, and the base can be easily fixed to the bracket.

(2) The bracket is formed integrally with the key cylinder body of the ignition key. Therefore, the fitting work of the key cylinder body to the steering column, or the like, can be omitted, the number of assembly steps can be decreased, and the production cost can be reduced.

(3) The bracket is formed integrally with the fitting portion to be fixed to the steering column. Therefore, the bracket can be firmly fixed to the steering column.

(4) The second engagement portion includes the resilient pawl plate engaging with the engagement portion formed on the engagement protuberance of the bracket, and the protrusion engaging with the longitudinal groove formed on the engagement protuberance. Therefore, the engagement protuberance can be firmly fixed to the base.

(5) The first engagement portion includes the step portion engaging with the pawl formed on the resilient engagement plate of the rotary connector. Therefore, the stationary case can be firmly fixed to the base, and the distal end of the resilient engagement plate is prevented from protruding from the first engagement portion and coming into contact with the bracket.

(6) The rotary connector has the first screw insertion hole for passing a screw, and the base has the second screw insertion hole for passing the screw, which is driven into the bracket. Therefore, the rotary connector and the base can be fixed at one time by the same screw to the bracket, the number of screws, the number of screwing steps and the number of steps of screw management can be reduced, the cost can be lowered and the assembly quality can be improved.

(7) The screw, consisting of only one screw, is driven into the screw hole in the bracket through the first screw insertion hole of the rotary connector and the second screw insertion hole of the base. Therefore, the rotary connector and the base can be screw-fixed to the base by one screw, and the number of steps of screwing works and the number of screws can be reduced.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A fitting structure of a rotary connector and a switch, comprising:

a rotary connector (1) having a resilient engagement plate (3d) to be snap-fitted to a base (5) of a switch (4);

said base (5) having a first engagement portion (5b) engaging with said resilient engagement plate (3d) of said rotary connector (1) and a second engagement portion (5c) engaging with an engagement protuberance (7b) of a bracket (7) fixed to a steering column; and said bracket (7) having said engagement protuberance (7b);

wherein said second engagement portion (5c) includes a resilient pawl plate (5e) engaging with an engagement portion (7c) formed on said engagement protuberance (7b), and a protrusion (5f) engaging with a longitudinal groove (7d) formed on said engagement protuberance (7b).

2. A fitting structure of a rotary connector and a switch according to claim 1, wherein said bracket (7) is formed integrally with a key cylinder body (7e) of an ignition key.

3. A fitting structure of a rotary connector and a switch according to claim 1, wherein said bracket (7) is formed integrally with a fitting portion (7f) fixed to the steering column.

4. A fitting structure of a rotary connector and a switch, comprising:

a rotary connector (1) having a resilient engagement plate (3d) to be snap-fitted to a base (5) of a switch (4);

said base (5) having a first engagement portion (5b) engaging with said resilient engagement plate (3d) of said rotary connector (1) and a second engagement portion (5c) engaging with an engagement protuberance (7b) of a bracket (7) fixed to a steering column; and said bracket (7) having said engagement protuberance (7b);

wherein said first engagement portion (5b) includes a step portion (5d) engaging with a pawl formed on said resilient engagement plate (3d).

5. A fitting structure of a rotary connector and a switch, comprising:

a rotary connector (1) having a resilient engagement plate (3d) to be snap-fitted to a base (5) of a switch (4);

said base (5) having a first engagement portion (5b) engaging with said resilient engagement plate (3d) of said rotary connector (1) and a second engagement portion (5c) engaging with an engagement protuberance (7b) of a bracket (7) fixed to a steering column; and said bracket (7) having said engagement protuberance (7b);

wherein said rotary connector (1) includes a first screw insertion hole (3a) for passing a screw (6), and said base includes a second screw insertion hole (5a) for passing the screw, which is driven into a screw hole (7a) in said bracket (7) so that said rotary connector may be fixed to the base.

6. A fitting structure of a rotary connector and a switch according to claim 5, wherein said screw (6), consisting of a single screw, is engaged into said screw hole (7a) of said bracket (7) through said first screw insertion hole (3a) of said rotary connector (1) and said second screw insertion hole (5a) of said base (5).

7. A fitting structure of a rotary connector and a switch, comprising:

a rotary connector (1) having a resilient engagement plate (3d) to be snap-fitted to a base (5) of a switch (4);

said base (5) having a first engagement portion (5b) engaging with said resilient engagement plate (3d) of said rotary connector (1), and a second engagement portion (5c); and a bracket (7) fixed to a steering column, said bracket (7) having an engagement protuberance (7b), said second engagement portion (5c) engaging with said engagement protuberance (7b);

wherein said second engagement portion (5c) includes a resilient pawl plate (5e) engaging with an engagement portion (7c) formed on said engagement protuberance (7b), and a protrusion (5f) engaging with a longitudinal groove (7d) formed on said engagement protuberance (7b);

wherein said first engagement portion (5b) includes a step portion (5d) engaging with a pawl formed on said resilient engagement plate (3d);

wherein said rotary connector (1) includes a first screw insertion hole (3a) for passing a screw (6), and said base includes a second screw insertion hole (5a) for passing the screw, which is driven into a screw hole (7a) in said bracket (7) so that said rotary connector may be fixed to the base; and wherein said screw (6) is engaged into said screw hole (7a) of said bracket (7) through said first screw insertion hole (3a) of said rotary connector (1) and said second screw insertion hole (5a) of said base (5).

* * * * *